Nov. 14, 1944.  R. W. MILLER  2,362,919
AIRCRAFT STRUCTURE
Filed Nov. 21, 1941  2 Sheets-Sheet 1

INVENTOR
Robert Wendell Miller
BY
Robert C. Rasche
ATTORNEY

Nov. 14, 1944.    R. W. MILLER    2,362,919
AIRCRAFT STRUCTURE
Filed Nov. 21, 1941    2 Sheets-Sheet 2
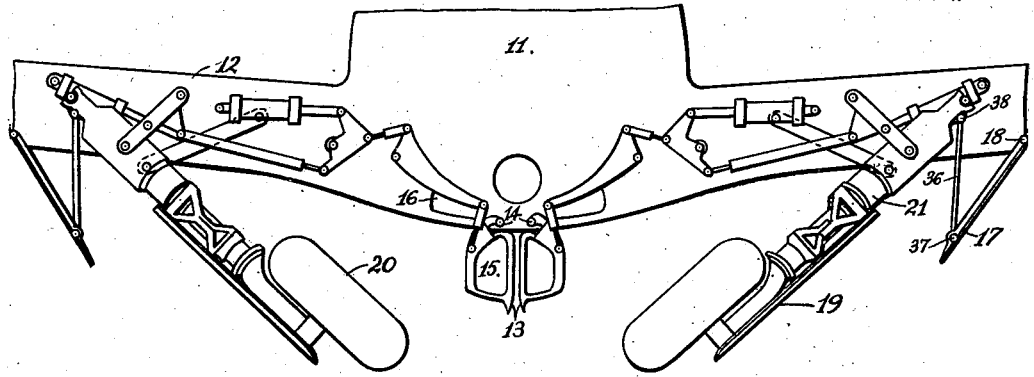
Fig. 3
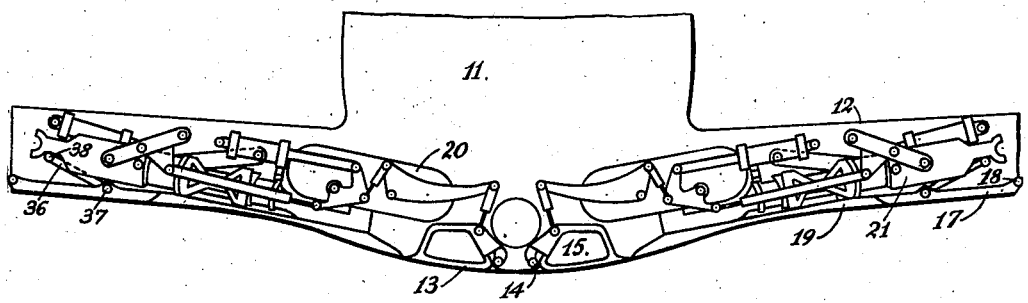
Fig. 4
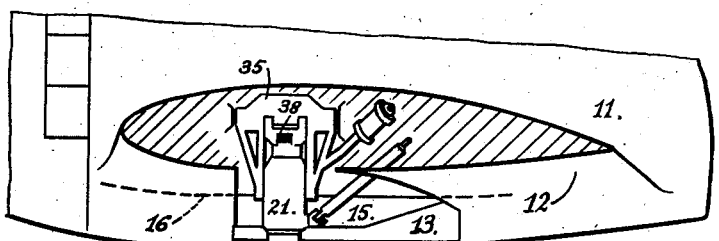
Fig. 5
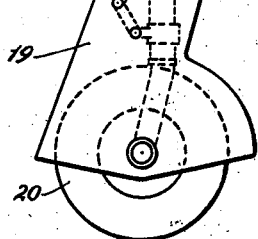
INVENTOR
Robert Wendell Miller
BY
Robert C. Rasche
ATTORNEY Patented Nov. 14, 1944

2,362,919

UNITED STATES PATENT OFFICE 2,362,919

AIRCRAFT STRUCTURE

Robert Wendell Miller, Farmingdale, N. Y., assignor to Republic Aviation Corporation, a corporation of Delaware Application November 21, 1941, Serial No. 420,008

8 Claims. (Cl. 244—102)

The invention relates to improvements in fully retractable landing gear for aircraft and is more specifically concerned with the wheel fairing used in connection with such landing gear to cover the wheels in their retracted position and form then a substantial continuation of the wing under-surface.

The general object of these improvements is to reduce to a minimum the number of auxiliary parts, fairing, links, levers, braces, etc. projecting below the lower surface of the wing in the extended position of the landing gear, as these parts are then exposed and will be sprinkled with mud when the aircraft is taxied across a wet airfield and in order to minimize the drag. More specifically, the object of the invention is to eliminate the section of fairing usually found adjacent the lower part of each wheel, from the landing gear itself, and to mount this section directly on the wing.

The main feature of the invention consists in subdividing the fairing of each wheel leg into three parts: a middle portion permanently and rigidly attached to the strut of the wheel and two lateral flaps, hinged to the wing structure at the opposite ends of the opening, provided in said structure for the passage of the landing gear.

Another feature is the provision of an operating mechanism including a mechanical connection between these two flaps and the cross heads of the landing gear retracting mechanism, which will be entirely enclosed within the wing even in the extended position of the landing gear, and which will be such that these flaps will be automatically swung clear of the wheel as this latter moves from or enters the wing and will be returned back into their closed position immediately after each extension or retraction of the landing gear.

A further feature consists in adapting each inner hinged flap for carrying a section of the supercharger duct, thereby allowing this section to be moved out of the way of the wheel, both when the landing gear is retracted and folded inward within the wing or is swung outward and extended in its active position.

Other features of the invention will become apparent from the reading of the following description, made in reference to the accompanying drawings, which show, as an example, one embodiment of the invention. It is to be understood, however, that the invention is limited in the embodiments it can take only by the scope of the sub-joined claims.

In these drawings:

Figure 3 is a view similar to Figure 2 showing the landing gear in an intermediary position, and the two hinged flaps in their open position;

Figure 4 is another view similar to Figure 2, showing the landing gear in its closed or retracted position; and Figure 5 is a fragmentary side elevation corresponding to Figure 2 with the wing shown in transversal section along line 5—5 of this Figure 2.

Figure 1:
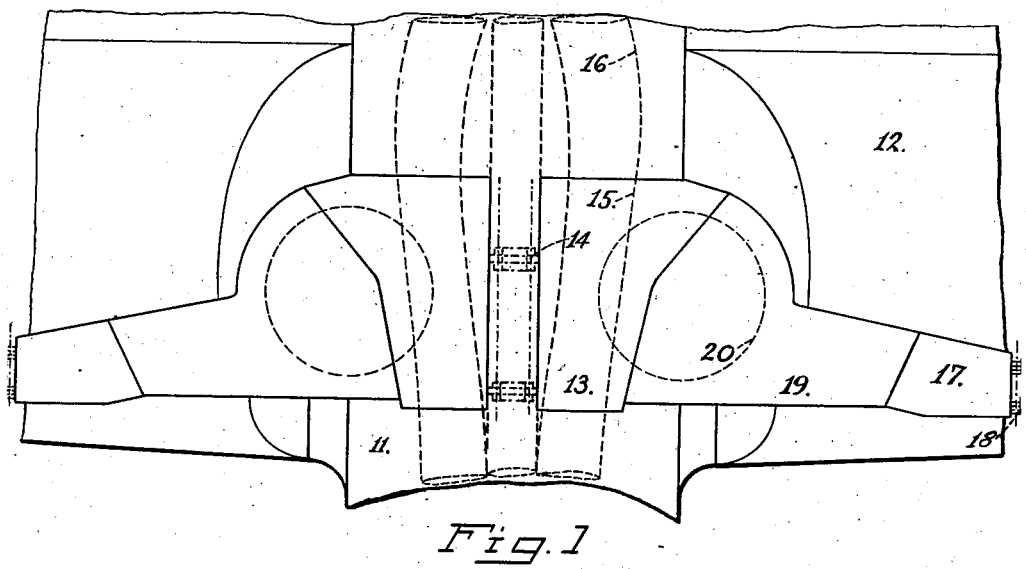
Figure 1 is a fragmentary bottom view of an aircraft, showing the central portion of the wing enclosing this embodiment of the landing gear according to the present invention and the fairing parts in their closed position.

In these figures, 11 indicates the fuselage of the aircraft and 12 the wing. The wheel fairing of the landing gear comprises a pair of inner flaps 13, each hinged at 14 to the wing structure and carrying a section 15 of a supercharger duct 16, a pair of outer flaps 17, likewise hinged at 18 to the wing structure and a pair of middle portions 19, permanently and rigidly attached to the oleo shock absorbing struts 21, carrying the wheels 20 for ground contact.

A mechanical connection between each strut 21 and the corresponding inner flap 13 of the fairing is established by the intermediary of a link 23, pivoted to this flap at 22 and to a first lever 25 at 24.

Each of these levers 25 is pivoted at 26 to the wing structure and is pivotally linked to a second lever 28 through the intermediary of a link 27.

Each lever 28 comprises an arm 30, pivoted to a booster cylinder 31, and a second arm 32, pivoted to a link 33, which in turn is pivoted to a bracket 34, carried on the crosshead 35 of the landing gear retracting mechanism.

A similar, though simpler, mechanical connection between each of the crossheads 35 and the corresponding outer flap 17 is established by means of a link 36, pivoted respectively to the flap at 37 and to the crosshead at 38.

The crossheads 35 move inboard as the landing gear is extended. This action presses the links 33 inboard and, through the levers 28, 25 lowers automatically the fairing flaps 13 in the position shown in Figure 3 before each swinging outward and down of the wheels 20 so as to clear the passage of these wheels, while simultaneously the fairing flaps 17 are lowered through the action of the links 36.

Figure 2:
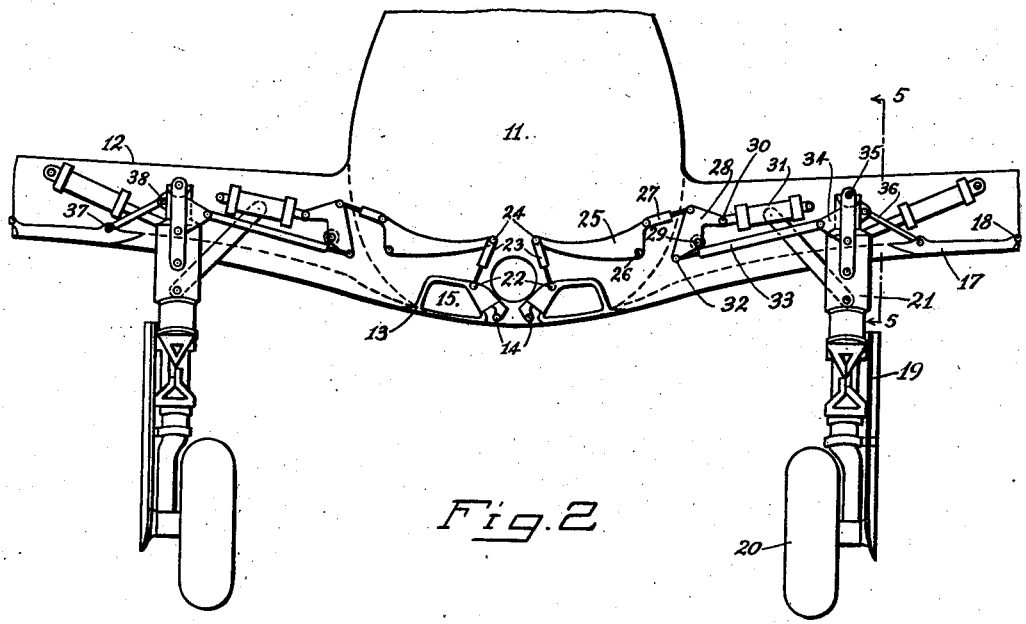
Figure 2 is a fragmentary front elevation of this aircraft, showing the landing gear in its active position and having parts broken away to show the details of the mechanical connection between the crosshead of the landing gear retracting mechanism and the hinged flaps of the fairing.

These two mechanical connections between the oleo-struts 21 of the landing gear and respectively the inner and outer fairing flaps 13, 17 are such that during the rest of the extension movement of the landing gear, when the wheels 20 pass from the intermediary position of Figure 3 to the fully extended and opened position of Figure 2, these flaps are automatically returned back in their closed position.

Conversely, when these wheels 20 are swung back from their active position of Figures 2, 5 to their retracted position of Figure 4 at the end of the take-off, the flaps 13, 17 are successively re-opened and closed again by the reversed movement of the oleo-struts 21.

Each inner hinged flap 13 is provided around each joining edge of the duct section 15 with suitable washer (not shown) to insure proper tightness of the two joints between this section 15 and the rest 16 of the supercharger ducts.

Having now made certain the nature and purposes of my invention, and at least one mode of executing same in such manner as to enable anyone skilled in the art to which it apertains to make and use same, as required by the statutes, that which I claim as my property and desire to secure by Letters Patent of the United States of America is:

1. In an aircraft landing-gear system including a landing-leg carrying a wheel: a leg-and-wheel fairing group, comprising a middle fairing-portion rigidly attached to the leg; an inwardly rotatable flap pivotally mounted on the aircraft inboard of the landing-leg mounting; and an outwardly rotatable flap pivotally mounted on the aircraft outboard of said landing-leg mounting.

2. In an aircraft cantilever landing-gear of the type including a cantilever landing-leg and wheel retractable into a center-section of a thin wing: a leg-and-wheel fairing group, comprising a middle fairing-portion rigidly attached to the leg; a flap pivotally mounted directly on said center-section and adapted to be indirectly opened by the movement of said leg; and another flap freely rotatably mounted directly on another major component of the aircraft and adapted to be indirectly rotated by the movement of said leg.

3. In an aircraft landing gear of the type including a leg and wheel retractable into a leg and wheel well: a fairing-group for normally covering the major area of said well both when the leg is fully protracted and when it is fully retracted, comprising a flap pivoted at the inboard end of said well and provided with means for maintaining it in closed position with the leg either protracted or retracted; a flap pivoted at the outboard end of said well and provided with means for maintaining it in closed position with the leg either protracted or retracted; and a common means for swinging both flaps open to clear the path of the leg and wheel upon the beginning of both retraction and protraction thereof.

4. In an aircraft landing gear of the type including a leg-and-wheel retractable into a well: a fairing-group for completely closing the entire area of said well both when the leg is fully protracted and when the leg is fully retracted, comprising a fairing-portion pivotally mounted near the inboard end of said well and normally maintained in closed position; a fairing portion rigidly mounted on said leg; a fairing-portion pivotally mounted near the outboard end of said well and normally maintained closed; means connected to said leg and said flaps for opening both said flaps when said leg begins to move from either the fully retracted or the fully extended positions; and means for returning said flaps to their normal position when said leg returns to its fully retracted or fully protracted position.

5. In a fairing system for a power-retracted leg-and-wheel: a pivotally mounted fairing-section; an auxiliary power-source; a link-system articulated at one end to the flap and terminating at the other end in a bell-crank; a connection between one arm of the bell-crank and said auxiliary; and a connection between the other arm of the bell-crank and the leg.

6. In an aircraft landing gear fairing system: a fairing section pivoted on the aircraft; a first link-member pivoted to said section; a first lever, having two arms, pivoted to the aircraft outboard of said link; a pivotal connection between the first one of said arms and said first link; a second link pivoted to the second one of said arms; a second lever pivotally mounted outboard of the second link and having three arms, one of said arms being pivoted to the proximate end of said second link; a third link pivoted to the second arm of said second lever; a connector on the leg, pivotally connected to the proximate end of said third link; and means for applying power to the third arm of the second lever.

7. In an aircraft having a landing leg and wheel retractable into a major component and including a conduit having a movable section normally lying in the path of movement of said leg and wheel: a flap pivoted to said major component to swing into and out of the path of movement of the said leg and wheel, said flap carrying the movable section aforesaid.

8. In an aircraft having a landing gear retractable into a major component, said aircraft including a conduit having a movable section extending through the retraction path of the landing gear, a flap pivoted to said major component to lie in said path, said flap carrying the aforesaid movable section of said conduit that lies in said path.

ROBERT WENDELL MILLER.